No. 782,886. PATENTED FEB. 21, 1905.
G. T. TURNER.
GEARING.
APPLICATION FILED MAY 6, 1901.
3 SHEETS—SHEET 1.
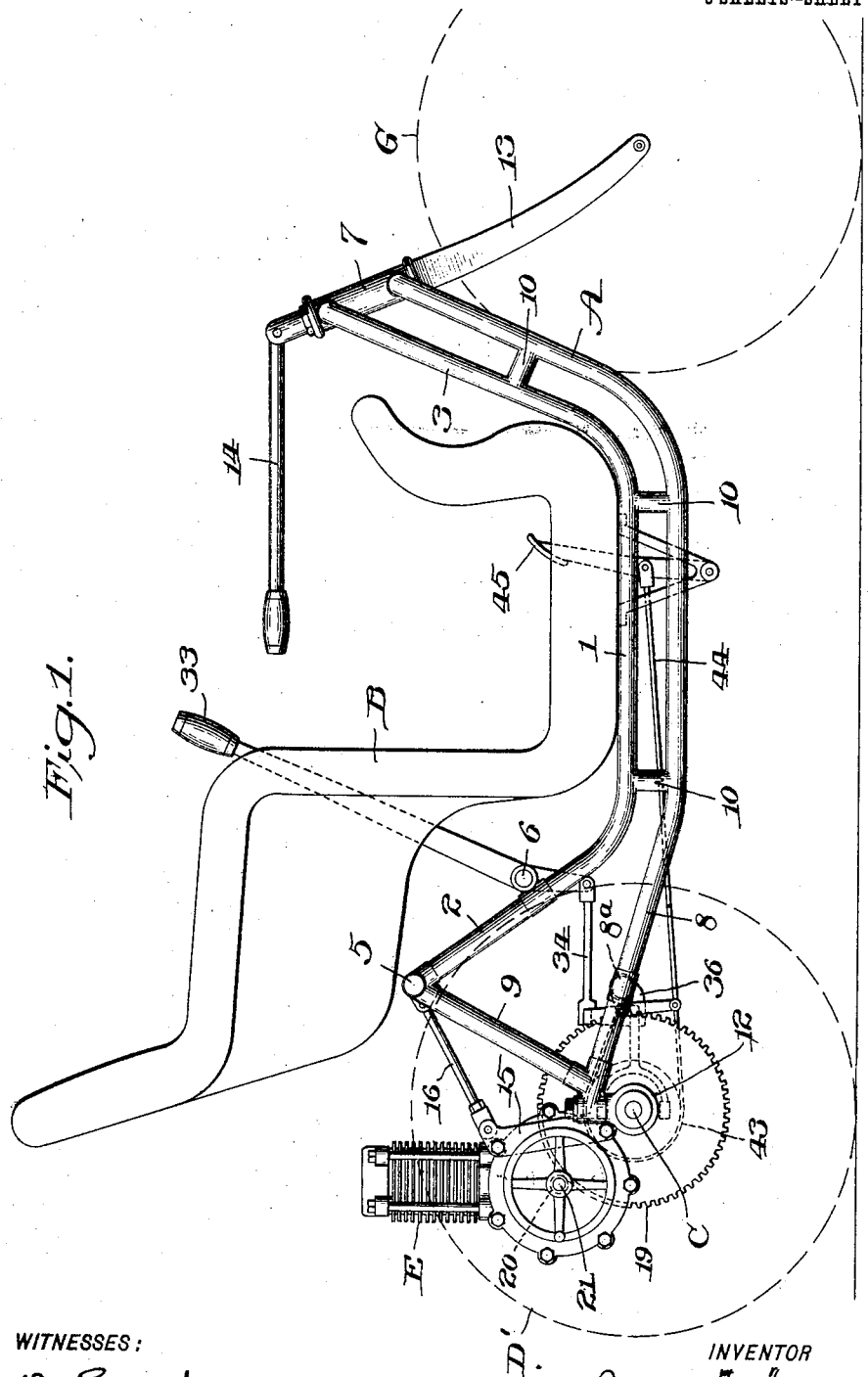
WITNESSES:
A. V. Grout
Ira S. Heller
INVENTOR
George T. Turner
BY John R. Nolan
ATTORNEY

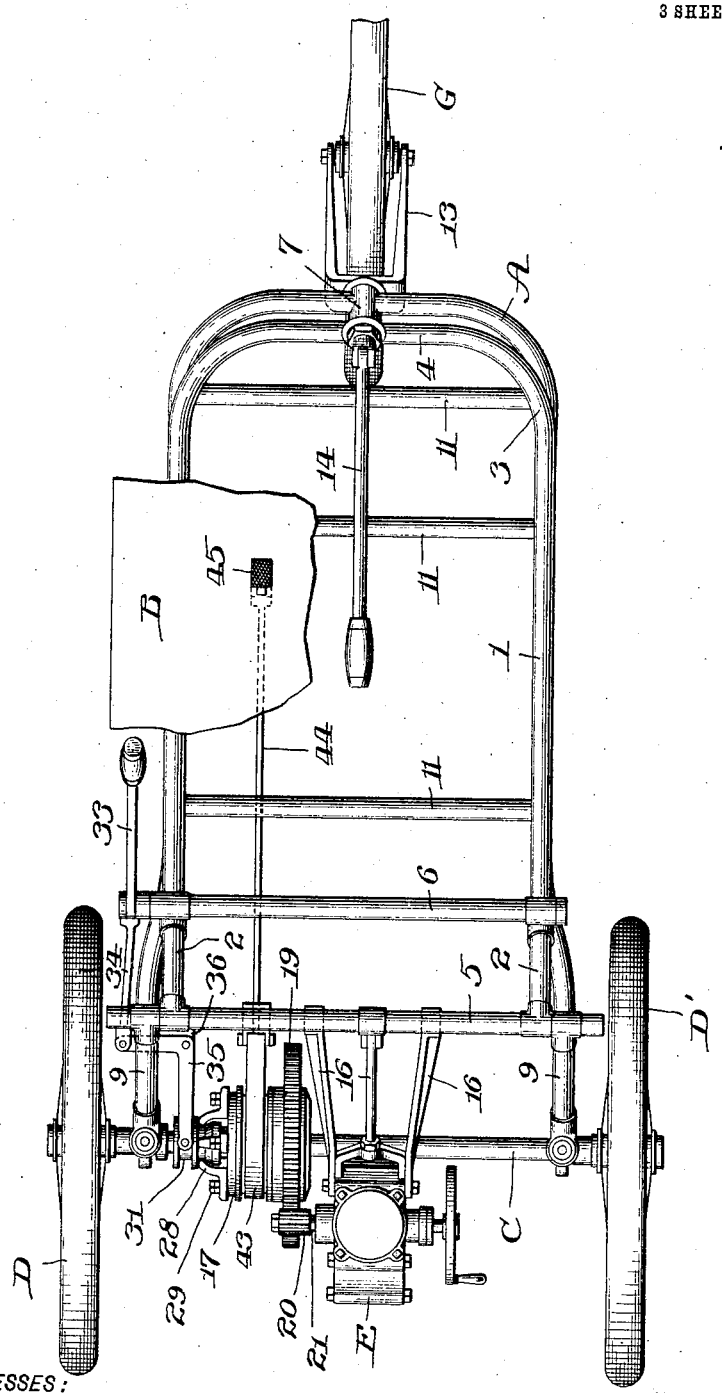

No. 782,886. PATENTED FEB. 21, 1905.
G. T. TURNER.
GEARING.
APPLICATION FILED MAY 6, 1901.
3 SHEETS—SHEET 3.
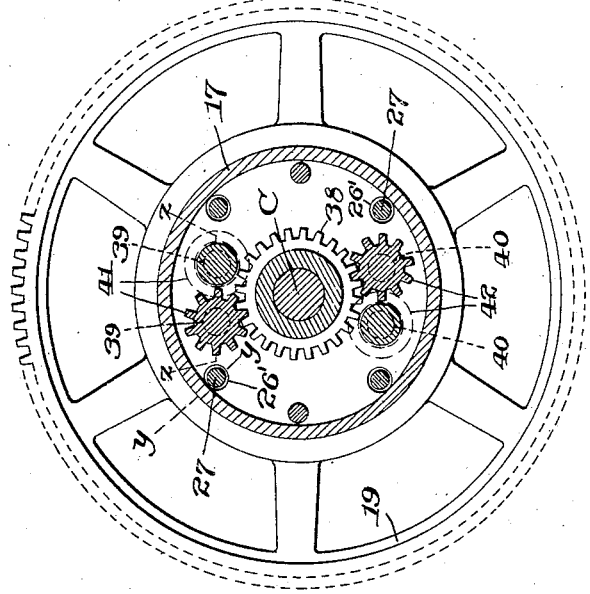
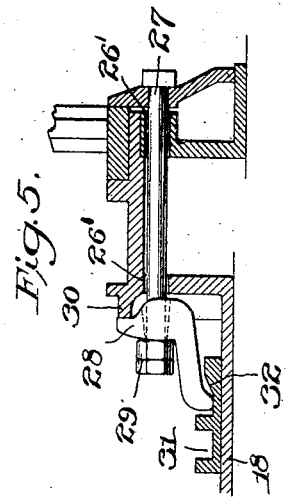
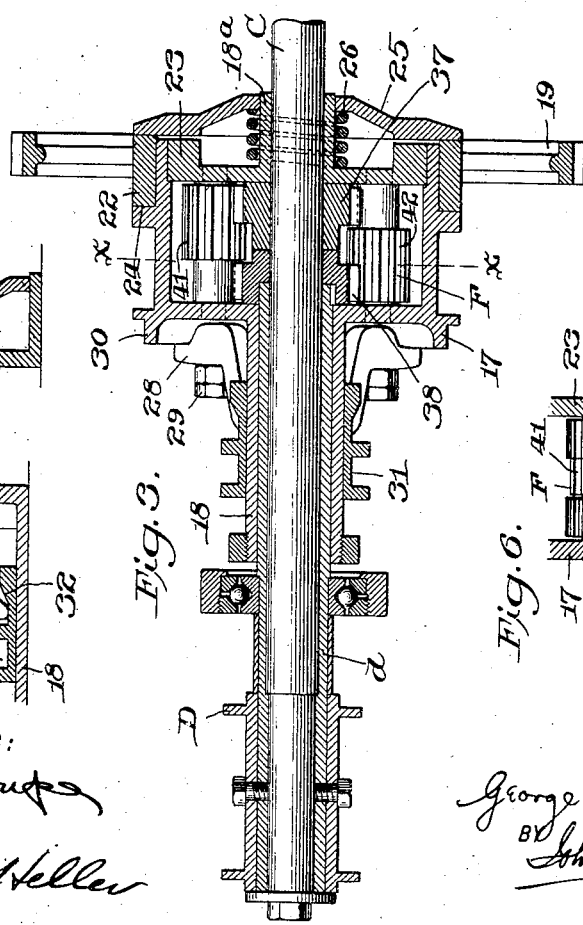
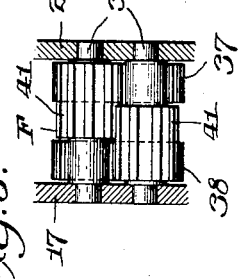
WITNESSES:
INVENTOR
George T. Turner,
BY John R. Nolan
ATTORNEY No. 782,886. Patented February 21, 1905.

UNITED STATES PATENT OFFICE.

GEORGE T. TURNER, OF PHILADELPHIA, PENNSYLVANIA.

GEARING.

SPECIFICATION forming part of Letters Patent No. 782,886, dated February 21, 1905.

Application filed May 6, 1901. Serial No. 58,879.

*To all whom it may concern:*

Be it known that I, GEORGE T. TURNER, a citizen of the United States, residing in the city and county of Philadelphia, in the State of Pennsylvania, have invented certain new and useful Improvements in Gearing, of which the following is a full, clear, and exact description, reference being had to the accompanying drawings, forming a part of this specification.

This invention relates to motor-vehicles, and has for its object to provide a structure which shall combine lightness, durability, and compactness with efficiency of operation and ease of manipulation.

My invention comprises primarily a novel and efficient driving-gearing whereby the wheels may be propelled at a uniform rate of speed during the onward traverse of the vehicle, but at a differential or variable speed during the turning or partial turning thereof.

It comprises also various novel constructions and combinations of parts, which will be hereinafter fully described and claimed.

In the drawings, Figure 1 is a side elevation of a motor-vehicle embodying my invention. Fig. 2 is a plan thereof. Fig. 3 is a vertical section, enlarged, through the differential driving-gearing. Fig. 4 is a transverse section as on the line $x\ x$ of Fig. 3. Fig. 5 is a sectional detail of the clutch as on the line $y\ y$ of Fig. 4. Fig. 6 is a similar detail as on the line $z\ z$ of Fig. 4.

A is the main frame; B, the body of the carriage supported thereon; C, the driving-axle arranged rearward of the frame; D D', the wheels, one of which is sleeved and the other fast on the axle; E, the motor, and F differential gearing whereby power and motion are transmitted from the motor to the wheels. G is a steering-wheel mounted in a rotatable steering-head at the front of the frame.

The frame is preferably, though not essentially, constructed of tubing shaped, braced, and connected to combine strength with lightness, as illustrated in Figs. 1 and 2 of the drawings, wherein it will be observed the frame includes among other things two corresponding pairs of tubular bars, which for a portion of their length constitute the respective sides of the frame and then at their forward ends are deflected inward toward each other to constitute the front end of the frame. The upper bar of each pair comprises a horizontal portion 1, rearwardly and upwardly inclined at its rearward end, as at 2, and forwardly and upwardly inclined for a portion of its length at its forward end, as at 3, and then turned inwardly in a horizontal plane, or substantially so, as at 4. The rearward extensions of the two upper bars are connected by cross-bars 5 and 6, while the forward extremities thereof terminate in and are united by a diagonally-disposed steering-head 7. The lower bar of each pair extends substantially parallel with the upper bar, excepting at the rearward extremity, which is extended beyond and inclined at a greater angle than the corresponding portion of the adjacent upper bar, as at 8. The forward extremities of the lower bars are connected with the steering-head similarly to the like parts of the upper bars. The rearward portions of the lower bars are connected by means of a cross-bar $8^a$, and the extremities of such portions are connected with the respective ends of the overlying cross-rods by inclined brace-rods 9. Each pair of bars is connected at points in their length by struts 10, the struts of one pair being connected with the opposite struts of the other pair by cross-bars 11. On the rearward extremities of the lower bars are depending boxes 12, in which the driving-axle C is mounted.

In the steering-head is supported the shaft or journal of a fork 13, carrying the wheel G, such shaft or journal being provided with a suitable handle 14, whereby it may be conveniently manipulated by the occupant of the vehicle.

The motor E may be of any usual or approved construction. It is supported by a rearwardly-extending auxiliary frame comprising side pieces 15, connected by bars 16 with the upper and lower cross-bars 5 $8^a$, respectively, of the main frame. The motor is connected with the axle and the wheel-bearing sleeve through a novel differential-gear mechanism which may be rendered active or idle at will by the actuation of a clutch device. This mechanism is of the following description: 17 is a cylindrical casing provided with hubs 18 $18^a$, one of which is elongated and loosely supported upon the sleeve $d$ of the wheel D, and the other is likewise mounted upon the axle, whereby the casing is freely rotatable independently of said sleeve and axle. Loosely mounted on this casing is a spur-wheel 19, which gears with a pinion 20 on the driving-shaft 21 of the motor in a manner to be driven by and concertedly with the latter, one edge of the hub 22 of the spur-wheel extending beyond the adjacent head 23 of the casing and the other edge thereof abutting against a circumferential rib or shoulder 24 on the casing. Slidingly fitted on the hub $18^a$ of the head is a disk 25, which may be moved against or from the opposing edge of the hub 22 to clamp the latter fixedly upon or release it from the casing. This disk thus constitutes a clutch member. It is maintained normally in the unclamping position by the action of a suitably-disposed spring 26, which encircling the hub or boss $18^a$ acts against the opposing faces of the disk 25 and head 23, respectively. Extending through suitably-disposed orifices 26' in the heads of the casing and in the disk, respectively, are longitudinally-disposed bolts 27, the extremities of which at or adjacent the outer face of the disk are headed, while the opposing extremities extend through levers 28 at the adjacent end head of the casing and are provided with set-nuts 29. These levers are fulcrumed upon a peripheral flange 30 of the end head, their free ends bearing upon a sliding collar 31 on the sleeve of the extended hub 18 of the casing. The periphery of this collar is provided with an inclined surface 32, to the end that when the collar is moved endwise from the casing the beveled surface will coact with the opposing ends of the levers in a manner to spread the same, and thus draw the bolts 27 longitudinally, thereby bodily moving the disk against the hub of the spur-wheel, and, perforce, clamping the latter upon the casing. If the collar 31 be released, the parts will resume their original or normal position by the recoil of the spring. The clamping movement of the collar is effected by the actuation of a hand-lever 33, which is fulcrumed at one side of the supporting-frame, so as to extend adjacent to the body of the vehicle in position to be conveniently grasped and manipulated by the occupant. The lower arm of the lever is connected, by means of a link 34, with one arm of crank-lever 35, which is fulcrumed on a bracket 36 on the main frame, the other arm of the latter lever being bifurcated and connected with the clutch-collar, whereby when the hand-lever is operated said collar will be shifted.

Fixed upon the axle C and sleeve $d$ are two gear-wheels 37 38, respectively, which are covered and concealed by the casing. There is a space between the toothed peripheries of the two wheels.

Journaled in and between the two heads of the casing are the shafts 39 40 of two pair of pinions 41 42, respectively, the adjacent pinions being in engagement with each other in the space between the gears 37 and 38. One pinion of each pair coacts with the gear-wheel 38 on the sleeve $d$ and extends into the space between the two gear-wheels 37 38, but not sufficiently far to mesh with the gear-wheel 37 on the axle, while the other pinion of each pair gears with the gear-wheel 37 on the axle and also extends into the intermediate space, but not sufficiently far to mesh with the gear-wheel 38 on the sleeve.

From the foregoing it will be seen that if the spur-wheel 19 be clamped upon the casing the latter will be positively driven thereby and that the pinions contained in the casing coacting with each other and with the gear-wheels on the sleeve and axle, respectively, will positively rotate said sleeve and axle, and thereby impel the vehicle. If the vehicle be going straight ahead, the sleeve and axle will be driven at a uniform rate of speed; but if the vehicle be turned or partially turned the inner or "pivot" wheel (whether it be the wheel sleeved or that fixed on the axle) will be driven at a slower rate of speed than the outer wheel—that is to say, when the vehicle is traveling directly forward a uniform pressure is exerted by and throughout the several coacting gear-wheels and in consequence a corresponding rotation of the sleeve and axle is attained; but during the turning or partial turning of the vehicle the action of the inner or pivot wheel is retarded, and hence the pinions which gear with the gear-wheel on the part carrying the inner wheel are caused to rotate independently about their own axes as well as about the axis of the axle, while the companion pinions remain in fixed relation to their own axes. It will be seen that by moving the clutch-disk gradually against or from the hub of the spur-wheel a gradual and easy starting or stopping of the vehicle may be accomplished.

I preferably provide the casing with a suitable brake, which in this instance comprises a metal band 43, embracing the periphery of the casing. One end of the band is secured to the frame, while the other end is connected, by means of a link 44, with a pedal-lever 45 in the bottom of the carriage-body, whereby when the said lever is actuated the band may be caused to hug the periphery of the casing with more or less pressure, as desired.

While the construction of the frame of the vehicle has been specifically described, the same is not claimed herein, as this will form the subject-matter of a divisional application to be filed.

I claim—

1. The combination with the axle and its wheels, one of which is sleeved and the other fast on the axle, of a rotatable support loosely mounted with respect to the sleeve and axle, said support having a rib arranged thereon, a driven member loosely mounted on said support at one side of said rib to coact with the latter, means independent of the support and movable laterally relative thereto for coöperating with the rib, whereby said driven member may be clamped against the rib and released therefrom to render said member fast or loose on said support, means interposed between the rotatable support and said clamping means for maintaining the latter normally in unclamping position, mechanism for driving said member, and differential gearing arranged in said support and connected with the axle and sleeve respectively.

2. The combination with the axle and its wheels, one of which is sleeved and the other fast on the axle, of a rotatable support loosely mounted with respect to the sleeve and axle, said support having a rib arranged thereon, a driven member loosely mounted on said support at one side of said rib to coact with the latter, means independent of the support and movable laterally relative thereto for coöperating with the rib, whereby said driven member may be clamped against the rib and released therefrom to render said member fast or loose on said support, means interposed between the rotatable support and said clamping means for maintaining the latter normally in unclamping position, mechanism for driving said member, independent gear-wheels fast on the axle and sleeve respectively, and pinions mounted in pairs on said support, the adjacent pinions coacting with each other in a space between said gear-wheels, one pinion of each pair coacting with the gear-wheel on the sleeve, and the other pinion of each pair coacting with the gear-wheel on the axle.

3. The combination with the axle and its wheels, one of which is sleeved and the other fast on the axle, of a rotatable casing loosely supported with respect to the axle and sleeve, said casing having a rib arranged thereon, a driven member loosely mounted on said casing at one side of said rib to coact with the latter, means independent of the casing and movable laterally relative thereto for coöperating with the rib, whereby said driven member may be clamped against the rib and released therefrom to render said member fast or loose on said casing, means interposed between the rotatable casing and said clamping means for maintaining the latter normally in unclamping position, gear-wheels fixed on the axle and sleeve respectively, and pinions mounted in pairs in said casing, the adjacent pinions coacting with each other in a space between said gear-wheels, one pinion of each pair coacting with the gear-wheel on the sleeve, and the other pinion of each pair coacting with the gear-wheel on the axle.

4. The combination with the axle and its wheels, one of which is sleeved and the other fast on the axle, of a cylindrical casing loosely mounted with respect to the sleeve and the axle, said casing having a rib arranged thereon, a driven member loosely mounted on said casing at one side of said rib to coact with the latter, a disk movable relatively to said casing and coöperating with said rib, whereby said member may be rendered fast or loose on the casing as desired, means interposed between the casing and said disk for maintaining the latter normally in unclamping position, independent gear-wheels fast on the axle and sleeve respectively and within said casing, and pinions mounted in pairs within said casing, the adjacent pinions coacting with each other in a space between said gear-wheels, one pinion of each pair coacting with the gear-wheel on the sleeve, and the other pinion of each pair coacting with the gear-wheel on the axle.

5. The combination with the axle and its wheels, one of which is sleeved and the other fast on the axle, of a cylindrical casing loosely mounted with respect to the sleeve and the axle, said casing having a rib arranged thereon, a driven member loosely mounted on said casing at one side of said rib to coact with the latter, a disk movable relatively to said casing and coöperating with said rib, whereby said member may be rendered fast or loose on the casing as desired, means interposed between the casing and said disk for maintaining the latter normally in unclamping position, independent gear-wheels fast on the axle and sleeve respectively and within said casing, pinions mounted in pairs within said casing, the adjacent pinions coacting with each other in a space between said gear-wheels, one pinion of each pair coacting with the gear-wheel on the sleeve, and the other pinion of each pair coacting with the gear-wheel on the axle, and brake mechanism coacting with said casing.

6. The combination with the axle and its wheels, one of which is sleeved and the other fast on the axle, of a rotatable support loosely mounted with respect to the sleeve and axle, said support having a rib arranged thereon, a driven member loosely mounted on said support at one side of said rib to coact with the latter, independent gear-wheels fast on the axle and sleeve respectively, pinions mounted in pairs on said support, the adjacent pinions coacting with each other in a space between said gear-wheels, one pinion of each pair coacting with the gear-wheel on the sleeve, and the other pinion of each pair coacting with the gear-wheel on the axle, and manually-controlled means for effecting a positive engagement of the driven member with said support, said means being independent of the support and movable laterally relative thereto for coöperating with the rib, whereby said driven member may be clamped against the rib and released therefrom to render said member fast or loose on said support.

7. The combination with the axle and its wheels, one of which is sleeved and the other fast on the axle, of a rotatable support loosely mounted with respect to the sleeve and axle, said support having a rib arranged thereon, a driven member at one side of said rib to coact with the latter for rotating said support, independent gear-wheels fast on the axle and sleeve respectively, pinions mounted in pairs on said support, the adjacent pinions coacting with each other in a space between said gear-wheels, one pinion of each pair coacting with the gear-wheel on the sleeve, and the other pinion of each pair coacting with the gear-wheel on the axle, a disk slidably mounted in relation to said support and coöperating with said rib for effecting a positive engagement of the driven member with said support, and means for operating said disk.

In testimony whereof I have hereunto affixed my signature in the presence of two subscribing witnesses.

GEORGE T. TURNER.

Witnesses:
    ANDREW V. GROUPE,
    JOHN R. NOLAN.